A. D. GALLAGHER.
LISTER PLOW.
APPLICATION FILED NOV. 29, 1919.
1,428,543.
Patented Sept. 12, 1922.
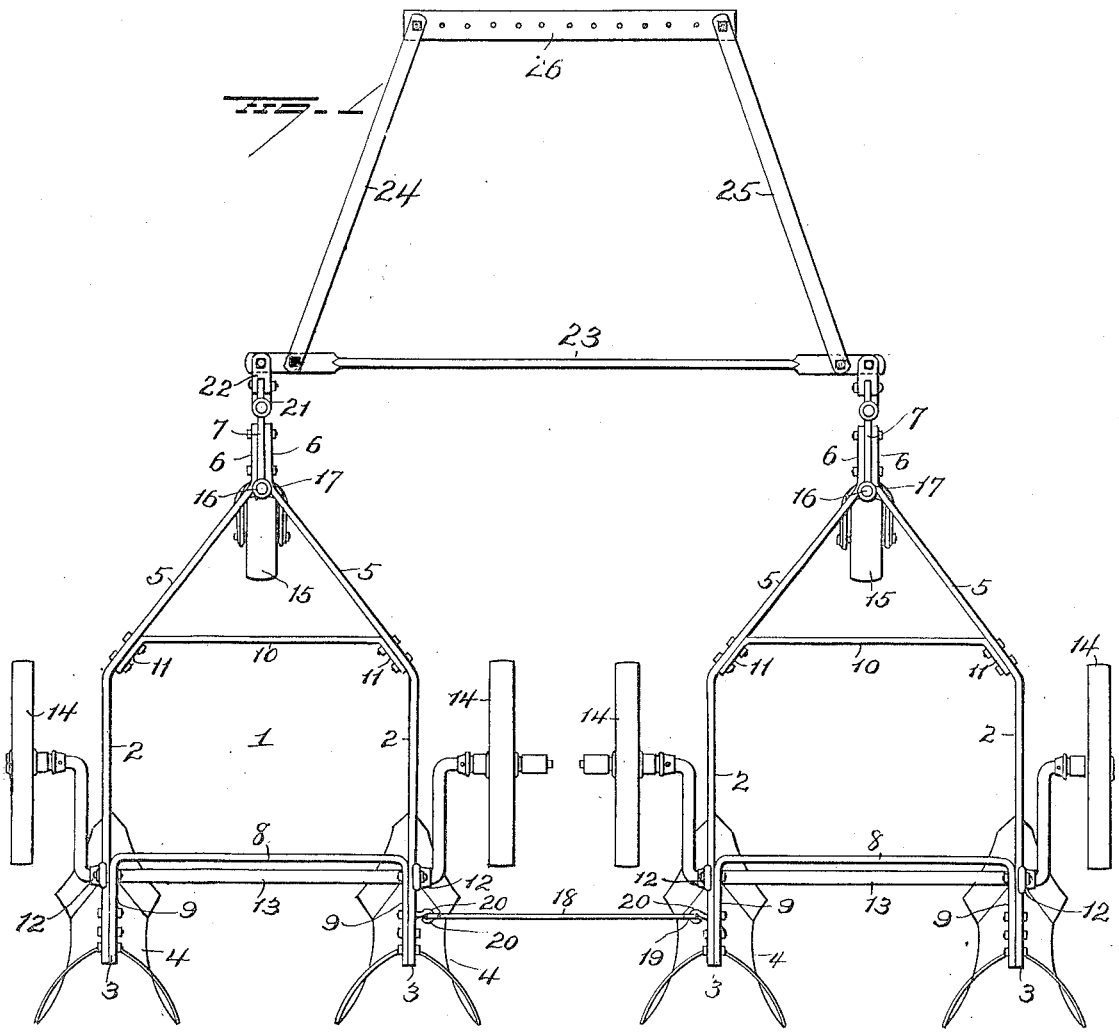
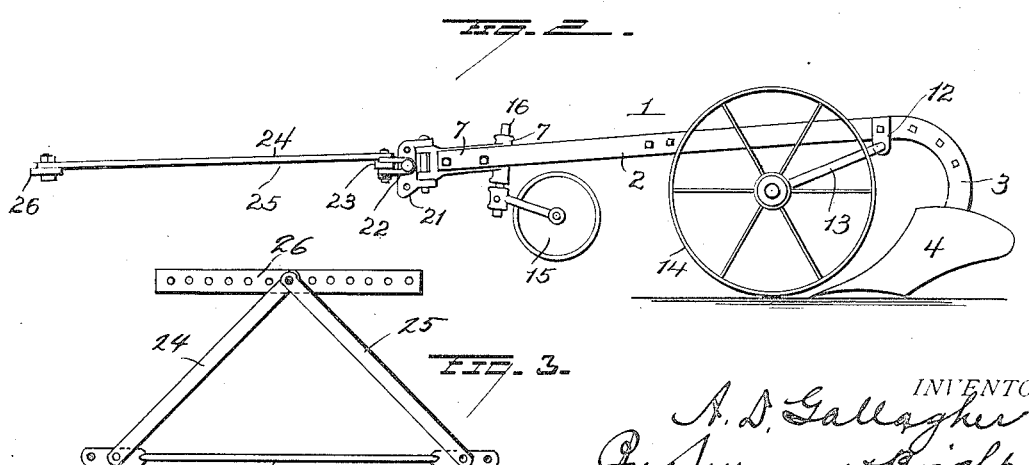
INVENTOR
A. D. Gallagher
By Seymour & Bright
Attorneys Patented Sept. 12, 1922.

1,428,543

UNITED STATES PATENT OFFICE.

ARTHUR D. GALLAGHER, OF SOUTH BEND, INDIANA, ASSIGNOR TO OLIVER CHILLED PLOW WORKS, OF SOUTH BEND, INDIANA.

LISTER PLOW.

Application filed November 29, 1919. Serial No. 341,349.

*To all whom it may concern:*

Be it known that I, ARTHUR D. GALLAGHER, a citizen of the United States, and a resident of South Bend, in the county of St. Joseph and State of Indiana, have invented certain new and useful Improvements in Lister Plows; and I do hereby declare the following to be a full, clear, and exact description of the invention, such as will enable others skilled in the art to which it appertains to make and use the same.

This invention relates to improvements in lister plows, one object of the invention being to construct a four row lister in such manner, that the employment of heavy framework shall be obviated.

A further object is to provide simple and efficient hitch and coupling mechanism for a multiplye-gang lister plow structure and adapted for use with a tractor as the draft means,—the construction being such that two double-row lister plows shall be suitably spaced apart and flexibly connected near respective ends; so that the plows will be kept from swinging too much when running idly, and so that undue strain on the parts shall be obviated.

With these and other objects in view, the invention consists in certain novel features of construction and combinations of parts as hereinafter set forth and pointed out in the claim.

In the accompanying drawings, Figure 1 is a plan view of a gang lister plow structure showing an embodiment of my invention, Figure 2 is a side elevation and Figure 3 is a view showing the arrangement of the draw-bars for a single point hitch.

1, 1 represent two row listers and are so associated and connected in parallel (as hereinafter explained) as to constitute a four-row lister plow.

Each two-row or double lister plow comprises side bars 2, 2 constituting beams provided at their rear ends with standards 3 to which plow bases 4 are secured, and said side bars are provided at their forward ends with diagonal extensions 5 which converge and terminate in parallel arms 6, 6 approximately in line with the longitudinal axis of the frame. Between the arms 6 a draw-bar 7 is secured. The rear portions of the side bars 2 are spaced apart by a transverse brace 8 having extensions 9 secured to the standards 3. The forward portion of the frame is straightened by a transverse brace 10 having arms 11 secured to the convergent extensions 5 of the side bars 2.

Bearing brackets 12 are secured to the side bars or beams 2 near the rear ends of the latter and serve as mountings for a crank axle 13, the spindle portions of which are mounted in the hubs of carrying wheels 14. A castor wheel 15 is located near the forward portion of the frame, the axle 16 for this wheel being mounted in a suitable bearing 17 located at the juncture of the bar extensions 5 with the arms 6.

Any suitable power lift mechanism may be provided for each double-row lister, but as such mechanism does not constitute part of my present invention, it need not be disclosed herein.

The rear portions of the double-row listers are flexibly connected by means of a rod 18, the ends of which are provided with eyes or hooks 19 loosely connected with hook-eyes 20 secured to side bars 2 of the respective listers near the juncture of the standards 3 with said side bars.

A clevis 21 is pivotally connected with the draw-bar 7 of each lister, and the clevises 21 of the two listers are connected by links 22 with respective end portions of a hitch bar 23, the latter serving to flexibly connect the forward portions of the two double-row listers.

Draw-bars 24—25 are connected with the hitch-bar 23 near respective ends thereof and these draw-bars are pivotally connected near their forward ends at two points on a clevis 26 for connection with a tractor.

It will be observed that my improvements provide a four-row lister plow comprising two double-row listers flexibly tied together near their respective ends and that a two-point hitch is provided between the tractor and the forward connecting or hitch bar 23. Such construction will prevent the plow from swinging too much when running idly, and a four-row lister plow is formed without the necessity for the use of heavy material as would be the case if four plow bases were connected with a single frame.

Should it be desired to use a single-point hitch instead of a two-point hitch, this could be accomplished as shown in Figure 3.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

A four-row lister plow comprising two double-row wheeled lister plows, a rod loosely connected at its respective ends with rear portions of the respective lister plows, to maintain them in spaced relation, clevises pivotally connected with the respective lister plows, a forward hitch bar, links connecting respective end portions of said forward hitch bar with the clevises of the respective lister plows, draw bars pivotally connected with respective end portions of said forward hitch bar, and a tractor clevis with which the forward end portions of said draw bars are connected.

In testimony whereof, I have signed this specification in the presence of two subscribing witnesses.

ARTHUR D. GALLAGHER.

Witnesses:
 EDWIN NICAR,
 GEORGE R. LANPHERE.